US008102238B2

(12) United States Patent
Golander et al.

(10) Patent No.: US 8,102,238 B2
(45) Date of Patent: Jan. 24, 2012

(54) USING AN RFID DEVICE TO ENHANCE SECURITY BY DETERMINING WHETHER A PERSON IN A SECURE AREA IS ACCOMPANIED BY AN AUTHORIZED PERSON

(75) Inventors: Amit Golander, Tel-Aviv (IL); Mark E. Peters, Chapel Hill, NC (US)

(73) Assignee: International Business Machines Corporation, Armonk, NY (US)

( * ) Notice: Subject to any disclaimer, the term of this patent is extended or adjusted under 35 U.S.C. 154(b) by 877 days.

(21) Appl. No.: 12/130,192

(22) Filed: May 30, 2008

(65) Prior Publication Data

US 2009/0295534 A1    Dec. 3, 2009

(51) Int. Cl.
*G05B 19/00*  (2006.01)
*G06F 17/00*  (2006.01)
*G09B 9/00*  (2006.01)

(52) U.S. Cl. ....... 340/5.2; 340/5.3; 340/572.1; 235/375; 348/143

(58) Field of Classification Search .......... 340/5.2–5.33, 340/10.1, 572.1, 5.61, 5.27, 686.6, 539.23; 348/143; 235/375–385
See application file for complete search history.

(56) References Cited

U.S. PATENT DOCUMENTS

| 5,874,869 | A | 2/1999 | Ueda et al. | |
| 6,504,470 | B2* | 1/2003 | Puchek et al. | 340/5.53 |
| 6,720,874 | B2* | 4/2004 | Fufido et al. | 340/541 |
| 6,801,640 | B1* | 10/2004 | Okubo et al. | 382/118 |
| 7,049,965 | B2 | 5/2006 | Kelliher et al. | |
| 7,123,146 | B1 | 10/2006 | Holzman | |
| 7,365,643 | B1* | 4/2008 | Cole | 340/539.11 |
| 7,466,224 | B2* | 12/2008 | Ward et al. | 340/522 |

\* cited by examiner

*Primary Examiner* — Benjamin C Lee
*Assistant Examiner* — Omeed Alizada
(74) *Attorney, Agent, or Firm* — Lee Law, PLLC; Christopher B. Lee

(57) ABSTRACT

Embodiments of the invention are generally directed to controlling access to an area or enclosed location, wherein any person in possession of a specified RFID badge or other RFID device is defined to be a person who is authorized to be in the area or location. One embodiment, directed to a method, includes the step of detecting the presence of a particular person in the area, who is not in possession of a specified RFID device. In response to detecting the presence of the particular person, a search is initiated to determine whether any authorized person is present in the area. Upon sensing the presence of one or more authorized persons in the area, the method further determines whether any of the sensed authorized persons is accompanying the particular person. In response to determining that no authorized person is accompanying the particular person, prespecified corrective action is initiated with respect to the particular person.

20 Claims, 7 Drawing Sheets

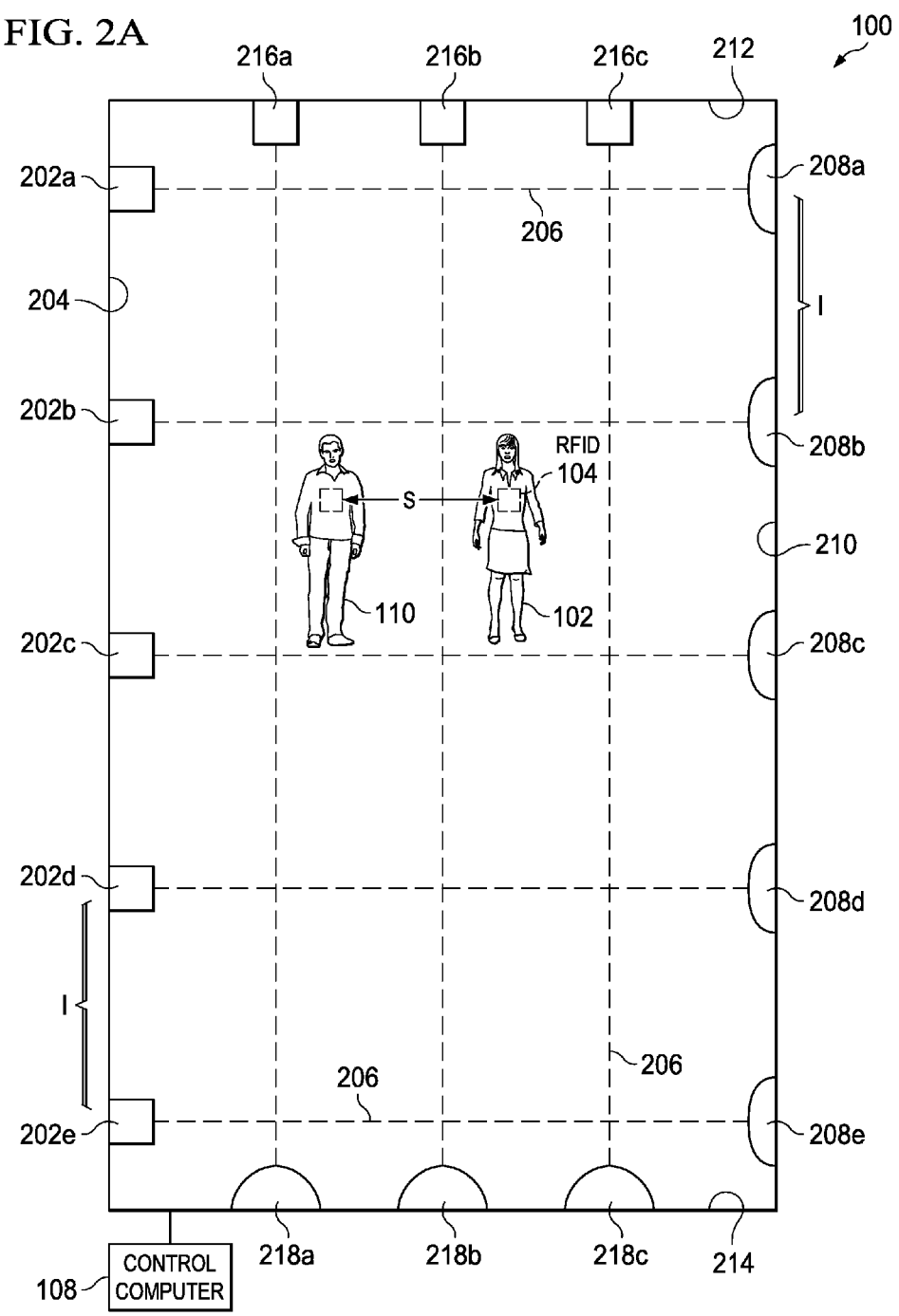

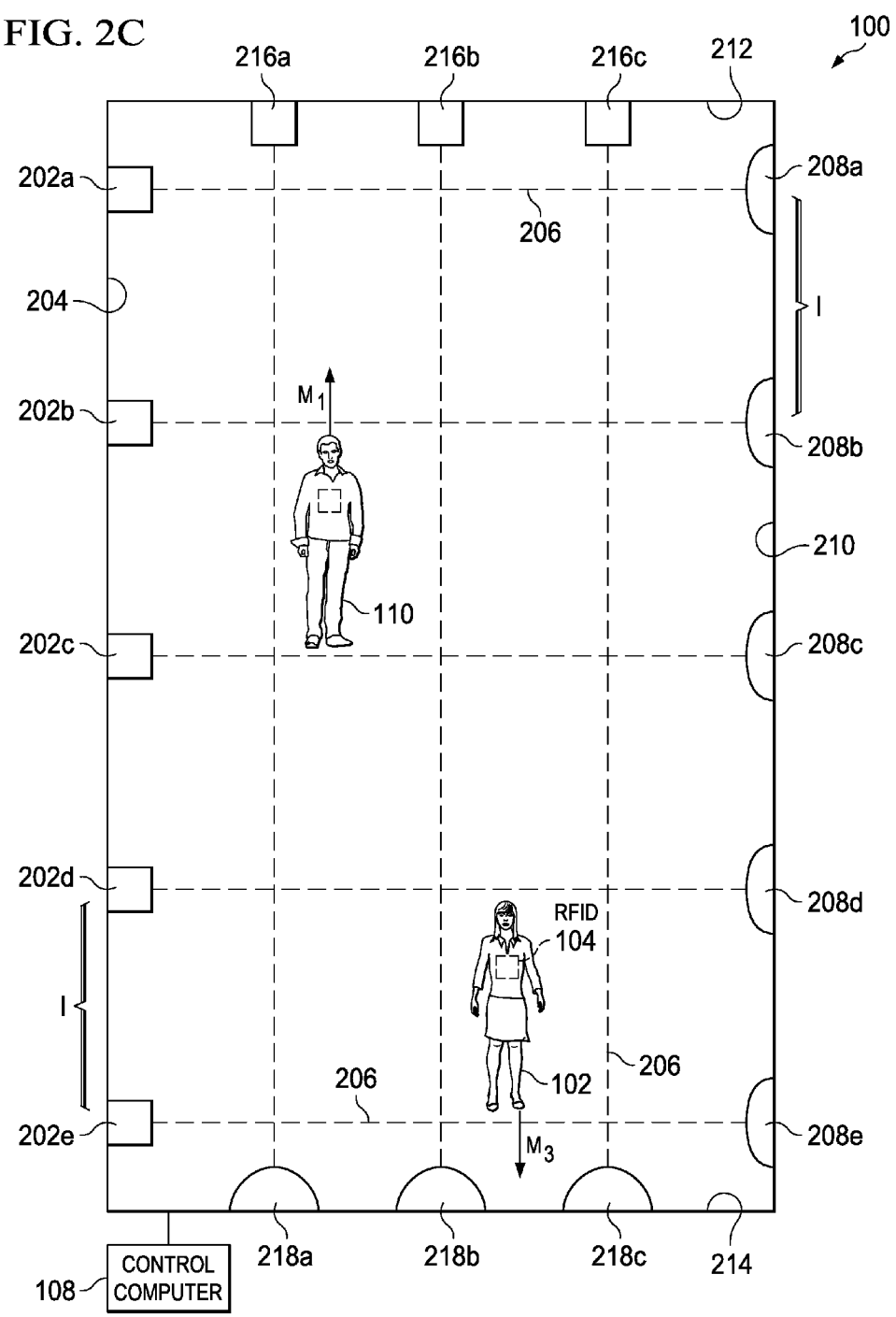

USING AN RFID DEVICE TO ENHANCE SECURITY BY DETERMINING WHETHER A PERSON IN A SECURE AREA IS ACCOMPANIED BY AN AUTHORIZED PERSON

BACKGROUND OF THE INVENTION

1. Field of the Invention

The invention disclosed herein is generally directed to enhancing security in an area or location, by determining whether a person in the area without personal authorization is accompanied by an authorized person. More particularly, the invention pertains to a method of the above type wherein an RFID device, such as an RFID badge or tag, is used to determine whether a person is authorized to be in the area. Even more particularly, the invention pertains to a method of the above type wherein one or more parameters, included in a set of motion and positional parameters, may be used to determine whether a person without personal authorization is being accompanied by an authorized person.

2. Description of the Related Art

Radio frequency identification (RFID) is an automatic identification method wherein data is selectively stored and remotely retrieved, by using devices that are variously known as RFID tags, badges or transponders. Due to their characteristics and capabilities, RFID devices are increasingly being used in security badges and the like, to confirm that persons using the badges are authorized to be in particular areas, locations or facilities to which access is limited. Confirmation can be readily carried out, simply by scanning RFID badges with an RFID reader, and then analyzing the identification information that is retrieved thereby. RFID badges can be used for a wide range of applications wherein access to enclosed facilities is limited to authorized persons, including both government and business related facilities.

In some facilities of the above type, guests, visitors or other persons who are normally unauthorized may be allowed to enter a restricted area, provided that they are accompanied by an authorized employee or the like. One example of such a facility would be the surgical area of a hospital. If someone is discovered in this area who does not have an RFID badge himself, and is not in close proximity to another person who does have a proper RFID badge, showing such person to be an authorized employee, then action of some sort must be taken right away.

Another example of facilities of the above type pertains to a business such as a jewelry store or an electronics retailer. When a customer enters certain high value merchandise or shoplifter prone areas in business establishments of these types, the retailer may require the customer to be accompanied by an employee at all times. Once again, if a customer is found to be in a sensitive area without an accompanying employee, immediate action must be taken.

In situations of the types described above, it would be very beneficial to provide a mechanism for very quickly detecting the presence of a person in a secure area who is not properly accompanied, and who is otherwise not authorized to be in the area, so that appropriate corrective action can be taken.

BRIEF SUMMARY OF THE INVENTION

Embodiments of the invention are generally directed to controlling access to an area or enclosed location, wherein any person in possession of a specified RFID badge or other RFID device is defined to be a person who is authorized to be in the area or location. One embodiment, directed to a method, includes the step of detecting the presence of a particular person in the area, who is not in possession of a specified RFID device. In response to detecting the presence of the particular person, a search is initiated to determine whether any authorized person is present in the area. Upon sensing the presence of one or more authorized persons in the area, the method further determines whether any of the sensed authorized persons is accompanying the particular person. In response to determining that no authorized person is accompanying the particular person, prespecified corrective action is initiated with respect to the particular person.

BRIEF DESCRIPTION OF THE SEVERAL VIEWS OF THE DRAWINGS

FIGS. 2A-C are schematic diagrams showing a mechanism for use in determining whether a person in an area is being accompanied by another person, in accordance with an embodiment of the invention.

DETAILED DESCRIPTION OF THE INVENTION

Figure 1A:
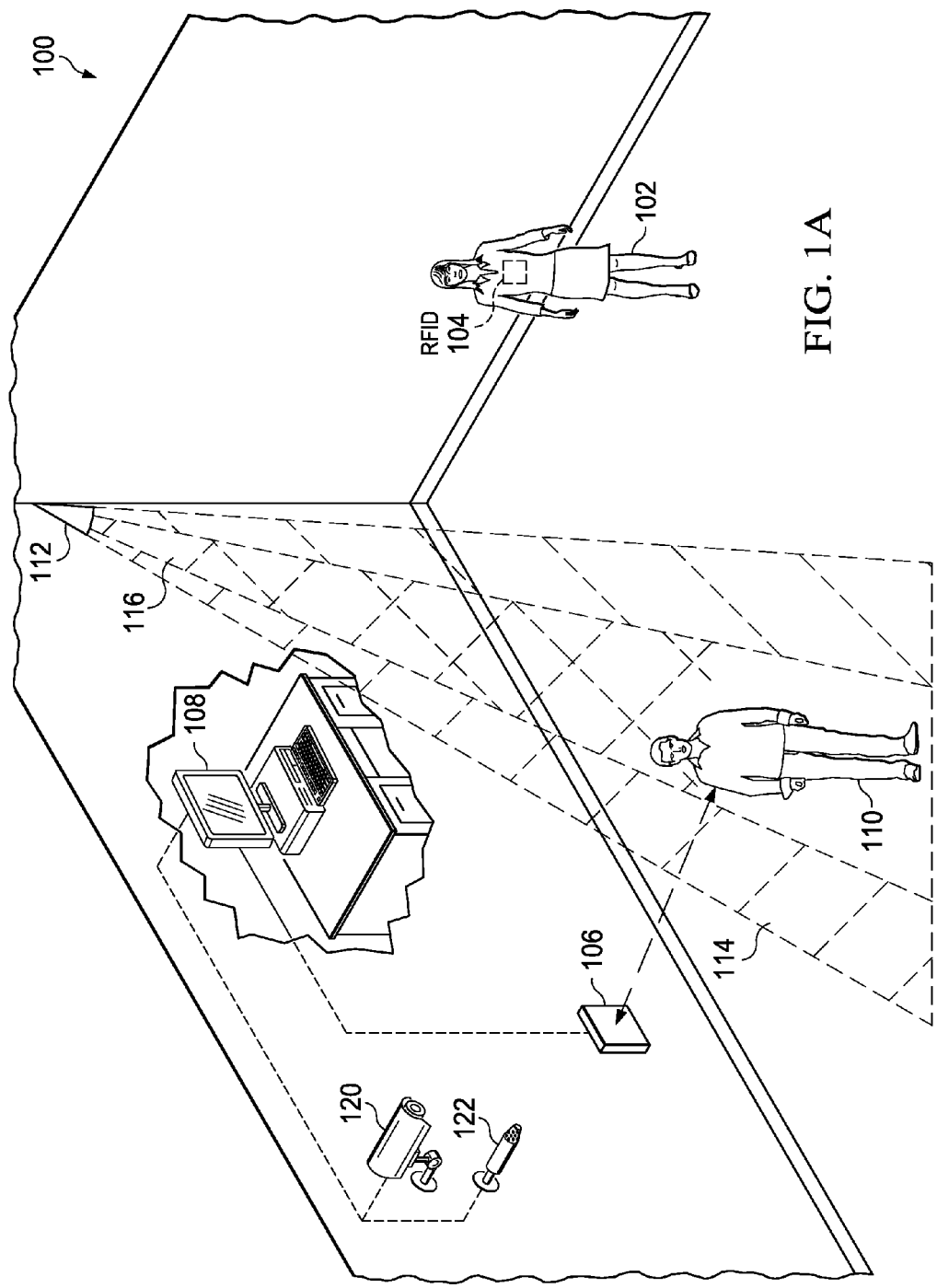
FIGS. 1A and 1B are schematic diagrams illustrating an embodiment of the invention, together with components that may be used therein.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1A, there is shown an enclosed area or location 100, wherein access to area 100 is limited to only certain authorized persons, such as person 102. Area 100 could, for example, be a surgical area of a hospital or a high value merchandise area of a business, as described above. More generally, area 100 could be a location of a type found in many different business environments, such as a location where proprietary information is kept or valuable items are stored, or where hazardous activities take place. Area 100 could alternatively be a government facility that contains records or information having a specified level of confidentiality. The invention, of course, is not limited to these examples.

In a useful embodiment of the invention, persons authorized to be in area 100 are generally provided with a badge or tag 104, which contains a detectable RFID device. As is known, an RFID device can be applied to a subject such as a product or person, for the purpose of providing identification data for the subject using radio waves. Some RFID devices can be read or detected by an RFID reader from a distance of 100 meters or greater. RFID devices typically contain an integrated circuit, for storing and processing information, and are further provided with an antenna for receiving and transmitting RF signals. Thus, by operating an RFID reader 106 that is adjacent to area 100, identity information can be retrieved from the RFID badge. Such information is then analyzed, in order to determine the identity of the person 102 who is carrying the RFID badge 104, and thereby confirm that such person 102 has authorization to be in area 100. FIG. 1A further shows a computer or data processing system 108 connected to RFID reader 106, to receive information from reader 106 and to perform the analysis tasks. Herein, the term "authorized person" includes a person who is in possession of an RFID badge or device that authorizes him or her to be in a particular area, or who is a member of a group that is authorized to be in the area.

Referring further to FIG. 1A, a person 110 is shown who is also permitted access to area 100, even though such person does not have an RFID badge 104, provided that the person 110 is accompanied by an authorized person 102. The person 110 could, for example, be a visitor or customer to a facility associated with secure area 100. Alternatively, person 110 could be an employee who did not have an RFID badge 104 at the facility, or who had an RFID badge which indicated an insufficient level of security to be in area 100 without being accompanied.

In order to detect any such person 110, the embodiment of FIG. 1A is provided with a motion detector 112. Detector 112 projects an RF energy beam into area 100 and receives back a reflected beam 114. When person 110 has entered area 100 and encounters beam 114, the normal beam pattern is changed by a reflected component 116, whereby detector 112 is informed of the presence of person 110. This information is sent from detector 112 to the control computer 108. Alternately, motion detector 112 could sense body heat to detect the presence of person 102 or 110.

In response to receiving notice of the presence of person 110 in area 100, computer 108 operates RFID reader 106 to scan person 110, in order to determine whether the person 110 is in possession of an RFID badge 104. This scan will indicate that the person 102 has no RFID badge or other RFID device. Alternatively, the scan may reveal that person 110 has an RFID badge, but the security level thereof is insufficient to allow person 110 to be in area 100 without being properly accompanied. Accordingly, computer 108 will commence a procedure to determine whether or not person 110 is accompanied in area 100 by an authorized person.

Figure 1B:
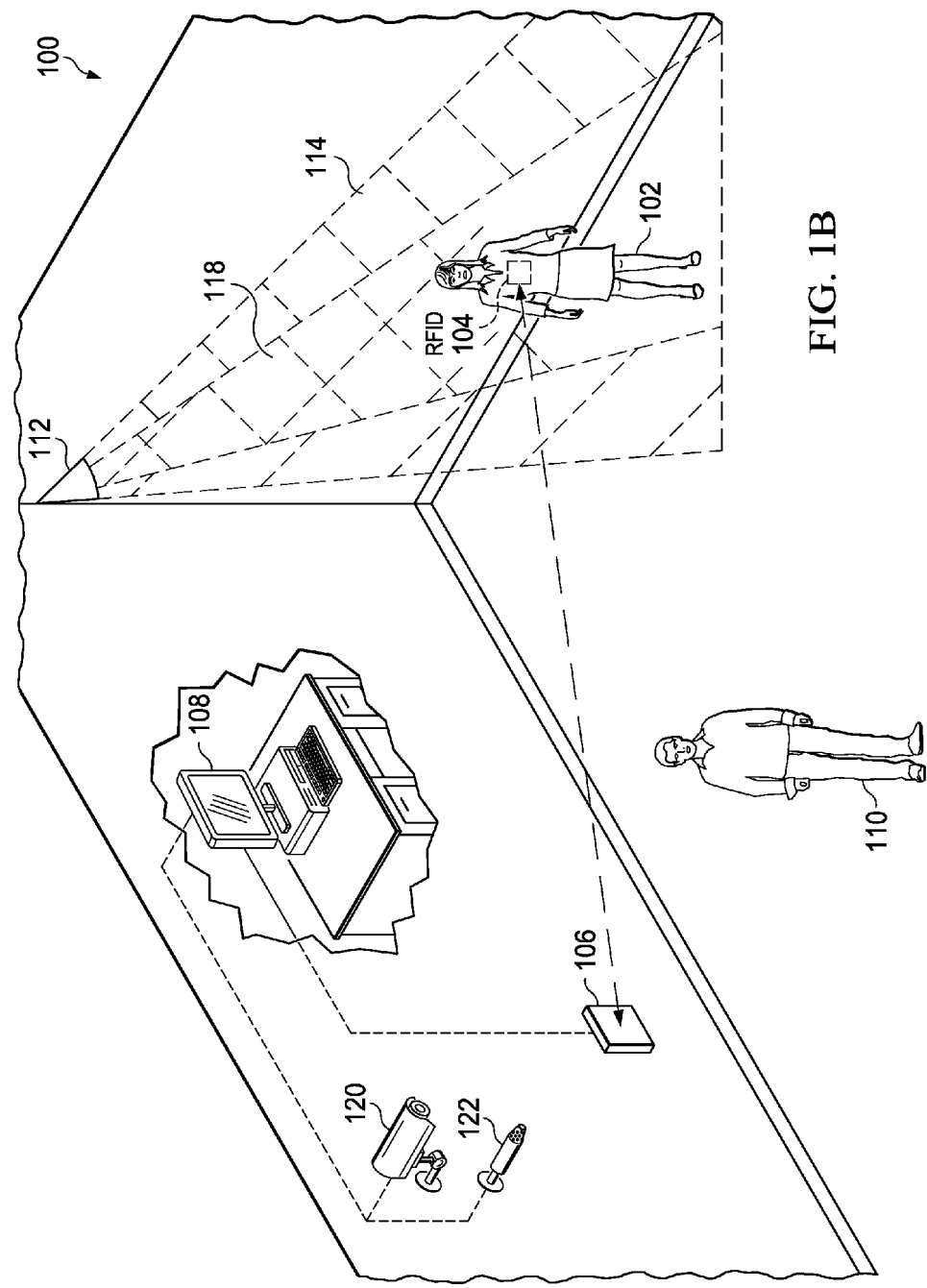

Referring to FIG. 1B, the motion detector 112 is operated to look for another person besides person 110 in area 100. Upon sensing a reflected component 118 in beam 114, where component 118 is reflected from person 102, the detector 112 recognizes the presence of person 102 in area 100. When control computer 108 is made aware of this, computer 108 operates RFID reader 106 to scan the person 102. This scan retrieves information from the badge 104 in possession of person 102, and such information confirms that person 102 is authorized to be in area 100. It then remains to determine whether or not person 110 is being accompanied by person 102.

In some embodiments of the invention, facial recognition or other electronic employee recognition technology could be used to supplement the use of RFID identification.

For some embodiments of the invention, it may be desirable to eliminate the need for a human observer to determine whether or not an authorized person is accompanying another person in a secure area. To achieve this, FIGS. 2A-C respectively show area 100 provided with a simplified configuration of sensor devices, which are used to monitor the respective positions and movements of persons who are present in area 100. More particularly, FIGS. 2A-C each show an array of beam projectors 202a-e positioned along a side wall 204 of area 100, at regularly spaced intervals I. Each projector 202a-e projects a beam 206 of light or other radiant energy to a complementary sensor 208a-e, respectively, that are mounted on an opposing side wall 210 of area 100. Sensors 208a-e are likewise spaced apart at intervals I. Accordingly, whenever a person is positioned between a projector and its complementary sensor, the beam between them is interrupted. Interruption of a beam 206 thus provides notice of the position of a person in area 100, with respect to spaced apart end walls 212 and 214 of area 100. In addition, a particular sequence of interruptions indicates the movement of the person through area 100. This information, along with the time it is acquired, is stored in computer 108.

Figure 2B:
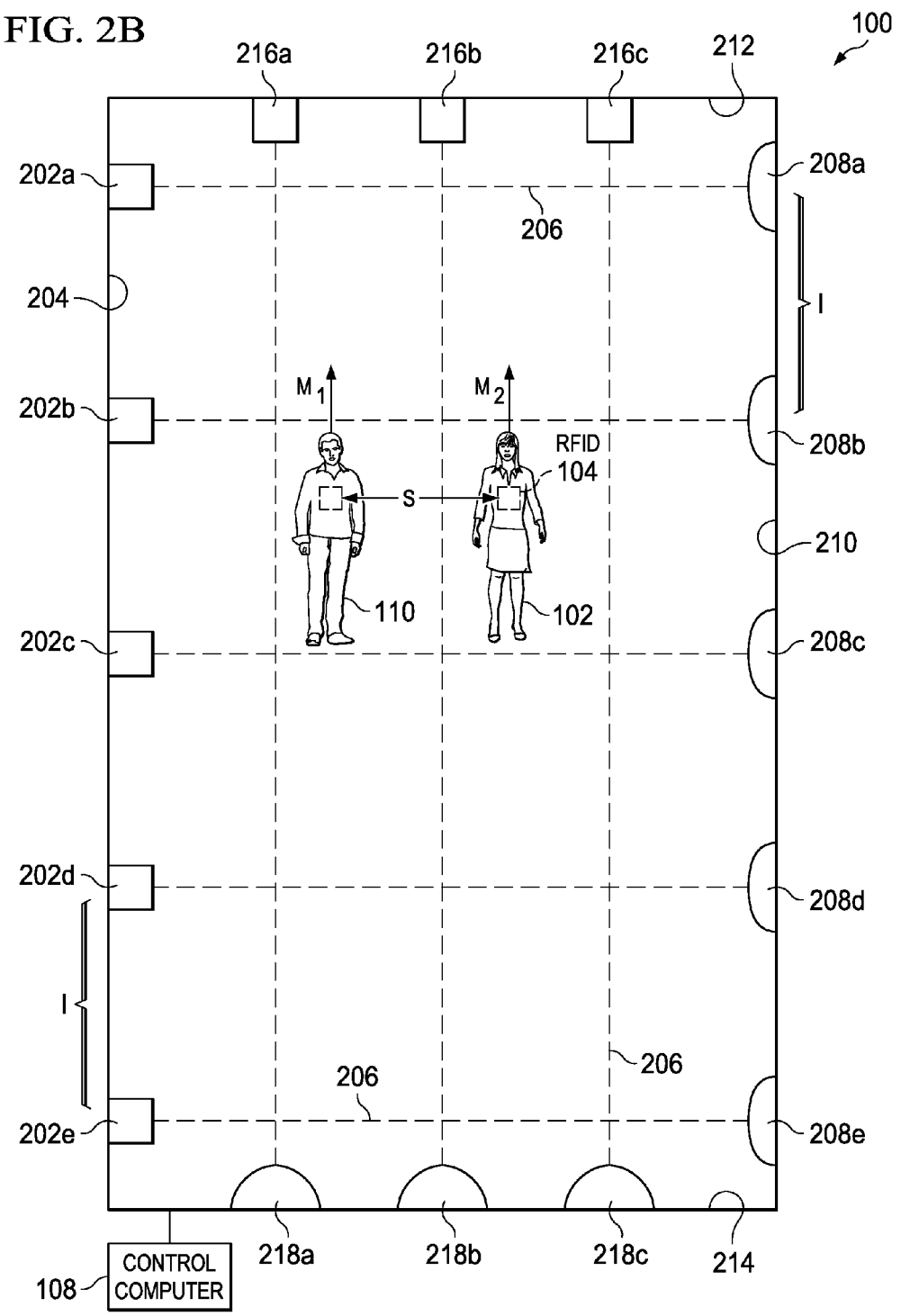

Similarly, an array of beam projectors 216a-c is positioned along end wall 212 at regular intervals, in order to project energy beams 206 to complementary sensors 218a-c, respectively, that are mounted on opposing end wall 214. Information pertaining to interruptions of the beams from projectors 216a-c is likewise furnished to and stored by computer 108. By providing an array of beam projectors and sensors along two dimensions, as shown by FIGS. 2A-2C, the positions of persons in area 100, as well as the movements or motions of each person, can be readily monitored and tracked. Alternately, infrared or other body heat sensing devices could be used instead of beam projectors and beam sensors.

As an example, FIG. 2A shows persons 102 and 110 in area 100 at a separation or spacing of S from one another. By previous operation of the sensor arrays as described above, this spacing is known to control computer 108. Moreover, in embodiments of the invention computer 108 is provided with a set of parameters which can be used to determine whether a person in area 100 is or is not accompanying another person therein. For example, if the spacing S is on the order of three feet, and this spacing is maintained by persons 102 and 110 for a period of five minutes, it would be reasonable to conclude that the two persons are together. Thus, a spacing of three feet and a time of five minutes could be two of the parameters included in the set.

Referring to FIG. 2B, there is shown movement of person 110 through area 100 described by a motion vector $M_1$. Similarly, movement of authorized person 102 is described by a motion vector $M_2$. Motion vectors $M_1$ and $M_2$ can be readily computed by computer 108, from position data of the two persons that has been provided by the two dimensional sensor array over a period of time. If the two motion vectors are found to be substantially the same, and spacing S is also within a prespecified amount, it is very likely that persons 102 and 110 are moving through area 100 together. Accordingly, it may be concluded that person 110 is being accompanied by person 102.

Referring to FIG. 2C, there is shown movement of person 102 described by a vector $M_3$, wherein $M_3$ is directed opposite to vector $M_1$ describing the movement of person 110. These two opposing vectors, together with a substantial spacing or separation between persons 102 and 110, indicate that person 102 is not accompanying person 110.

It will be readily apparent that other configurations and arrangements of detection devices, in addition to those shown herein, may be used to detect the presence of persons in area 100, and also to determine whether or not such persons are together. For example, motion sensing apparatus of the type shown in FIGS. 1A and 1B could be adapted to perform both of these functions. In addition, for a particular type of secure area or environment, appropriate motion and positional parameters would be developed that are appropriate for the particular area, for use in determining whether one person was accompanying another. In some embodiments of the invention, a self learning mechanism could be used to develop the set of parameters for a particular environment.

In another embodiment of the invention, microphone 122 shown in FIGS. 1A-1B could be used to monitor voice information in area 100. If monitored voice information disclosed a conversation between persons 102 and 110, such information would significantly enhance the conclusion that person 102 was accompanying person 110.

Figure 3:
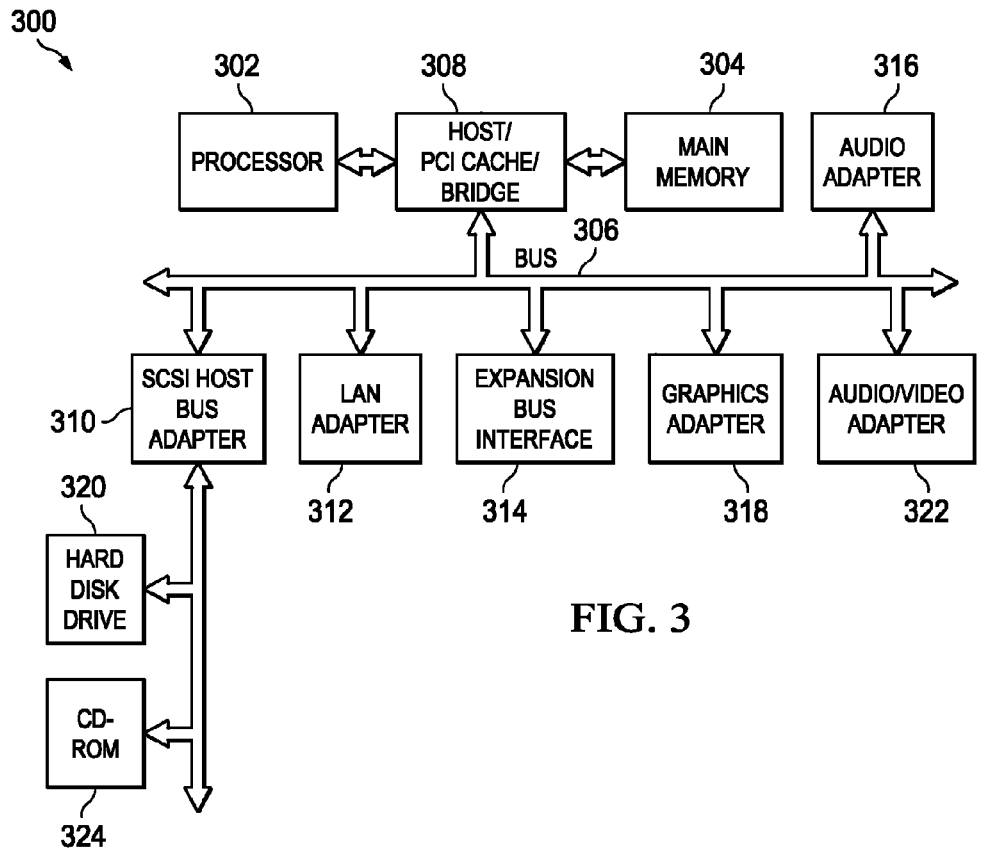
FIG. 3 is a block diagram showing a computer or data processing system that may be used in embodiments of the invention.

Referring to FIG. 3, there is shown a block diagram of a generalized data processing system 300 which may be adapted for use as the control computer 108 shown in FIGS. 1A-B and 2A-C. Data processing system 300 exemplifies a computer, in which code or instructions for implementing the processes of the present invention may be located. Data processing system 300 usefully employs a peripheral component interconnect (PCI) local bus architecture, although other bus architectures such as Accelerated Graphics Port (AGP) and Industry Standard Architecture (ISA) may alternatively be used. FIG. 3 shows a processor 302 and main memory 304 connected to a PCI local bus 306 through a Host/PCI bridge 308. PCI bridge 308 also may include an integrated memory controller and cache memory for processor 302.

Referring further to FIG. 3, there is shown a local area network (LAN) adapter 312, a small computer interface (SCSI) host bus adapter 310, and an expansion bus interface 314 respectively connected to PCI local bus 306 by direct component connection. Audio adapter 316, a graphics adapter 318, and audio/video adapter 322 are connected to PCI local bus 306 by means of add-in boards inserted into expansion slots. SCSI host bus adapter 310 provides a connection for hard disk drive 320, and also for CD-ROM drive 324.

An operating system runs on processor 302 and is used to coordinate and provide control of various components within data processing system 300 shown in FIG. 3. The operating system may be commercially available operating system such as Windows XP, which is available from Microsoft Corporation. Instructions for the operating system and for applications or programs are located on storage devices, such as hard disk drive 320, and may be loaded into main memory 304 by execution by processor 302.

Figure 4:
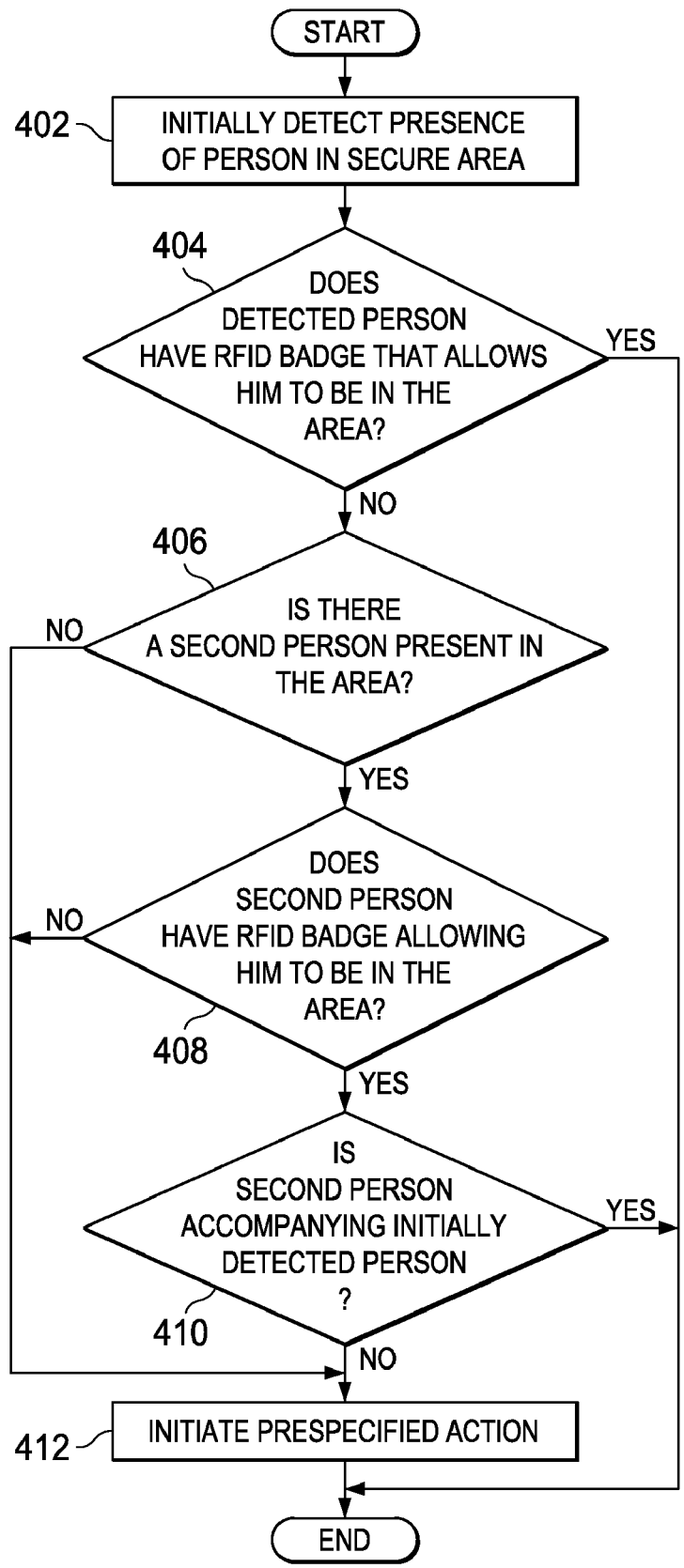
FIG. 4 is a flow chart showing principal steps for a method comprising an embodiment of the invention.

Referring to FIG. 4, there are shown principal steps comprising an embodiment of the invention. At step 402, a motion detector or other sensing device detects the presence of a person in an area that is secure or of limited access. An RFID reader or the like is then used, at step 404, to determine whether or not the detected person has an RFID badge or other device that authorizes him to be in the area. If this determination is positive, the method is ended. Otherwise, the method proceeds to step 406, where a search is made to determine whether any other person is present in the area. If a second person is found, it is necessary to determine whether such person is authorized to be in the area, as shown by step 408. If the query of step 408 is positive, it must then be decided whether the second person is accompanying the initially detected person, in accordance with step 410. The method ends, if the result of step 410 is positive. FIG. 4 further shows that if any of the steps 406, 408 or 410 produces a negative result, a prespecified corrective action is initiated, at step 412.

While not shown by FIG. 4, it is anticipated that if more than one other person is detected in the secure area following step 404, the queries of steps 406, 408 and 410 will be applied to each of such persons successively. This process will continue, either until it is determined that at least one of such person is accompanying the initially detected person, or it is alternatively determined that none of them are accompanying him.

When a prespecified action is initiated at step 412, an action will be carried out that is appropriate for the particular secure area, environment or situation. A fairly universal action, upon determining that an unauthorized person is in a restricted area without accompaniment, would be to generate an instruction to immediately send an authorized person to the area, to take necessary action in regard to the unauthorized person. Another common action would be to ensure that the unaccompanied person was immediately placed under video surveillance, if a video observation system was available.

It could also be very desirable for some situations, where possible, to make a record of actions of the unauthorized person while in the area. For example, a video could be acquired which showed things that he may have handled, actions he may have performed, or specific locations in which he spent time. This type of information could later be useful, if it was subsequently realized that items or objects in the area had been disturbed or seemed to be missing.

A further type of action could be used in connection with commercial establishments, where it was the intention to have customers accompanied at all times by employees, when the customers were in certain sales areas. This intention could derive from a policy that sought to enhance customer relationships and promote sales, as well as to discourage shoplifting or the like. In the above method, the total amount of time that a customer or other unauthorized person spent in the area would be recorded. This amount of time would then be compared with the portion of the total time that the customer was accompanied by at least one sales representative. Statistics generated from comparisons of this type could be very useful for certain management purposes.

Figure 5:
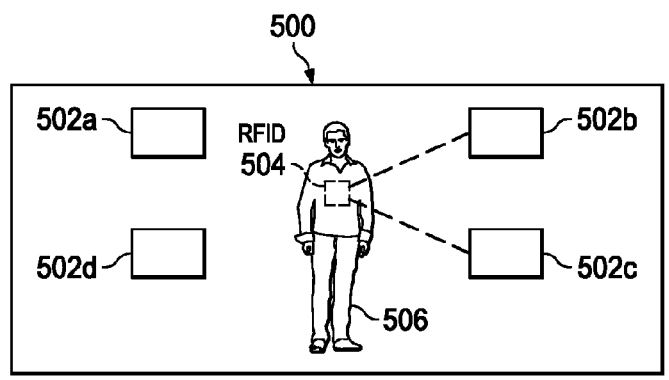
FIG. 5 is a block diagram showing an alternative embodiment of the invention.

If an area is comparatively large, a single RFID reader generally cannot pinpoint the location of a responding RFID tag. For example, a system with a single RFID reader with a range on the order of 100 meters could know that there were two people with a single RFID badge, but would not know which one was holding the badge. Accordingly, FIG. 5 shows an alternative embodiment, wherein a secure area 500 is provided with exemplary multiple RFID readers 502*a-d*. Each of these readers is of comparatively short range, such as a few meters. This allows finer grained location. Moreover, an RFID reader can measure the direction of received RF signals. Thus, the directions pointed to by two readers 502*b* and 502*c*, to an RFID tag 504 of a person 506, leads to an estimated location (the third vertex of a triangle).

In some cases in which two persons are very close, it may not be possible to clearly determine which one has the badge. However, if it is established that they are traveling together (e.g., 2-3 meters apart), the system can approve them as being accompanied.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for controlling access to an area, said method comprising the steps of:
   detecting the presence of a particular person in said area who is not in possession of one of a number of specified radio frequency identification (RFID) devices that each authorize a person to be in said area;
   responsive to detecting the presence of said particular person, initiating a search to determine whether any authorized person is present in said area by sensing whether a specified RFID device is present on one or more authorized persons;
   upon sensing the presence of the one or more authorized persons in said area, monitoring motion of the particular person relative to the sensed one or more authorized persons within the area over time;
   determining whether any of said sensed one or more authorized persons is accompanying said particular person based upon the monitored motion of the particular person relative to the sensed one or more authorized persons within the area over time; and
   responsive to determining that no authorized person is accompanying said particular person, initiating a pre-specified corrective action with respect to said particular person.

2. The method of claim 1, wherein:
   the presence in said area of said particular person or of any authorized person is detected by means of one or more motion detection devices located proximate to said area.

3. The method of claim 1, wherein:
   an RFID reader located proximate to said area is operable to determine that said particular person is not in possession of one of said specified RFID devices.

4. The method of claim 3, wherein:
   said RFID reader is operable to determine that each of one or more persons found to be present in said area is in possession of one of said specified RFID devices.

5. The method of claim 4, wherein:
   said RFID reader is operable to determine whether or not an RFID device detected by said RFID reader has an authorization level in a hierarchy of authorization levels that is sufficient to permit access to said area.

6. The method of claim 1, where determining whether any of said sensed authorized persons is accompanying said particular person based upon the monitored motion of the particular person relative to the sensed authorized persons within the area over time comprises:
   selecting one or more parameters from a set of parameters comprising at least pre-specified motion and positional parameters for use in determining whether an authorized person is accompanying said particular person.

7. The method of claim 1, wherein:
   said corrective action includes operating a video system to commence video surveillance of said particular person.

8. The method of claim 7, wherein:
   said corrective action includes operating a recording mechanism to record actions of said particular person in said area, and subsequently comparing said recorded actions with one or more selected conditions discovered in said area.

9. The method of claim 1, wherein:
   said corrective action includes notifying an operator of a video surveillance system to acquire video information pertaining to said particular person, while said particular person is in said area.

10. The method of claim 1, wherein:
    said corrective action includes generating an instruction to immediately send an authorized person to said area, in regard to said particular person.

11. The method of claim 1, where determining whether any of said sensed authorized persons is accompanying said particular person based upon the monitored motion of the particular person relative to the sensed authorized persons within the area over time comprises:
    recording a total amount of time that said particular person spends in said area; and
    comparing the total amount of time with a portion of said amount of time that said particular person is accompanied in said area by at least one authorized person.

12. Apparatus for controlling access to an area, said apparatus comprising:
    means for detecting the presence of a particular person in said area who is not in possession of one of a number of specified radio frequency identification (RFID) devices that each authorize a person to be in said area;
    means responsive to detecting the presence of said particular person, for initiating a search to determine whether any authorized person is present in said area by sensing whether a specified RFID device is present on one or more authorized persons;
    means responsive to sensing the presence of the one or more authorized persons in said area, for monitoring motion of the particular person relative to the sensed one or more authorized persons within the area over time;
    means for determining whether any of said sensed one or more authorized persons is accompanying said particular person based upon the monitored motion of the particular person relative to the sensed one or more authorized persons within the area over time; and means responsive to determining that no authorized person is accompanying said particular person, for initiating a pre-specified corrective action with respect to said particular person.

13. The apparatus of claim 12, wherein:
said means for detecting the presence in said area of said particular person includes a motion detection device located proximate to said area.

14. The apparatus of claim 12, wherein:
said detecting means include an RFID reader located proximate to said area, for determining that said particular person is not in possession of one of said specified RFID devices.

15. The apparatus of claim 14, wherein:
said RFID reader is operable to determine whether or not an RFID device detected by said RFID reader has an authorization level in a hierarchy of authorization levels that is sufficient to permit access to said area.

16. A computer program product in a computer readable storage device for controlling access to an area, said computer program product comprising:
first instructions for detecting the presence of a particular person in said area who is not in possession of one of a number of specified radio frequency identification (RFID) devices that each authorize a person to be in said area;
second instructions responsive to detecting the presence of said particular person, for initiating a search to determine whether any authorized person is present in said area by sensing whether a specified RFID device is present on one or more authorized persons;
third instructions responsive to the presence of the one or more authorized persons in said area, for monitoring motion of the particular person relative to the sensed one or more authorized persons within the area over time;
fourth instructions for determining whether any of said sensed one or more authorized persons is accompanying said particular person based upon the monitored motion of the particular person relative to the sensed one or more authorized persons within the area over time; and
fifth instructions responsive to determining that no authorized person is accompanying said particular person, for initiating a pre-specified corrective action with respect to said particular person.

17. The computer program product of claim 16, wherein:
the presence in said area of said particular person is detected by means of a motion detection device located proximate to said area, wherein said motion detection device is operated by said first instructions.

18. The computer program product of claim 16, wherein:
an RFID reader located proximate to said area is operated by said first instructions to determine that said particular person is not in possession of one of said specified RFID devices.

19. The computer program product of claim 16, wherein:
said RFID reader is operated by said second instructions to determine that each of one or more persons found to be present in said area is in possession of one of said specified RFID devices.

20. The computer program product of claim 16, where the fourth instructions for determining whether any of said sensed authorized persons is accompanying said particular person based upon the monitored motion of the particular person relative to the sensed authorized persons within the area over time comprise at least one instruction to:
select one or more parameters from a set of parameters comprising at least pre-specified motion and positional parameters for use by said fourth instructions to determine whether an authorized person is accompanying said particular person.

* * * * *